United States Patent
Ahn et al.

(10) Patent No.: US 6,302,780 B1
(45) Date of Patent: Oct. 16, 2001

(54) CEILING GRILLE FOR ROOFTOP AIR CONDITIONER UNIT

(75) Inventors: Young Kill Ahn, Kwangju; Jeong-Un Lyu, Kwang Ju; Jong-Ho Kim, Seoul, all of (KR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/580,072

(22) Filed: May 30, 2000

(51) Int. Cl.$^7$ .................................................... B60H 1/00
(52) U.S. Cl. ............................................ 454/136; 454/153
(58) Field of Search .................................. 454/136, 137, 454/143, 153, 155, 256, 285, 313, 318, 321

(56) References Cited

U.S. PATENT DOCUMENTS

| 3,868,896 | * | 3/1975 | Doll et al. | 454/136 |
| 3,937,133 | * | 2/1976 | Bertin et al. | 454/136 |
| 4,417,687 | * | 11/1983 | Grant | 236/9 A |
| 4,709,623 | * | 12/1987 | Roth et al. | 454/136 |
| 5,501,634 | * | 3/1996 | Wilder | 454/136 |
| 6,196,914 | * | 3/2001 | Lyu | 454/153 |

* cited by examiner

Primary Examiner—Harold Joyce
Assistant Examiner—Derek S. Boles
(74) Attorney, Agent, or Firm—Wall Marjama & Bilinski

(57) ABSTRACT

A ceiling grille for directing conditioned air from an air conditioning unit mounted upon the roof of a motor vehicle wherein comfort air is delivered into a plenum located inside the vehicle. The plenum has front and rear deflector vanes rotatably mounted therein for directing comfort air into the passenger compartment. Each vane has a rocker arm that is connected through suitable linkage to a cam follower. Each cam follower, in turn, rides on the cam face of a motor driven cam. The profile of the cam face is contoured to position the two vanes to control the direction of comfort air flow into the passenger compartment.

6 Claims, 3 Drawing Sheets

CEILING GRILLE FOR ROOFTOP AIR CONDITIONER UNIT

FIELD OF THE INVENTION

This invention relates generally to apparatus for distributing comfort air within the passenger compartment of a motor vehicle from an air conditioning unit that is mounted on the roof of the motor vehicle and, in particular, to a ceiling grille that is capable of being mounted in the passenger compartment that contains front and rear comfort air deflectors that are mounted in an air plenum.

BACKGROUND OF THE INVENTION

Typically, a roof mounted air conditioner for a recreational vehicle, mini bus, or the like provides certain space saving benefits as well as more efficient comfort air distribution to all parts of the passenger compartment.

The roof top unit is generally arranged to draw warm air upwardly from the passenger compartment, pass the air through an evaporator to cool the air and then return the cooled air downwardly through the roof into the passenger compartment. The conditioned air will herein be referred to as comfort air. Controlling the distribution of comfort air within the passenger compartment has at times been a problem because the air distribution vanes typically must be adjusted manually by the passengers. This is not only bothersome, but also cooling efficiency is reduced.

SUMMARY OF THE INVENTION

It is therefore an object of the present invention to improve roof top air conditioning systems used in motor vehicles and, in particular, recreational vehicles.

It is a further object of the present invention to more efficiently distribute comfort air from a roof top air conditioning unit throughout the passenger compartment of a motor vehicle.

A further object of the present invention is to automatically adjust the comfort air deflectors of a motor vehicle roof top air conditioning system to more efficiently distribute the comfort air within the passenger compartment.

These and other objects of the present invention are attained by means of a ceiling mounted grille for a motor vehicle for distributing comfort air from a roof top air conditioning unit throughout the passenger compartment. A ceiling mounted grille is arranged to receive conditioned air from the unit. The grille contains a comfort air plenum having front and rear deflectors that are rotatably mounted in the front and rear walls of the plenum. A rocker arm is attached to each deflector and the rocker arms are, in turn, connected to cam followers that ride in contact with the cam face of a motor driven cam. The cam face is profiled to control the positioning of both deflectors to provide for efficient front and rear distribution of comfort air.

BRIEF DESCRIPTION OF THE DRAWING

For a further understanding of these and objects of the present invention, reference will be made to the following detailed description of the invention which is to be read in connection with the accompanying drawing, wherein.

DETAILED DESCRIPTION OF THE INVENTION

Figure 1:
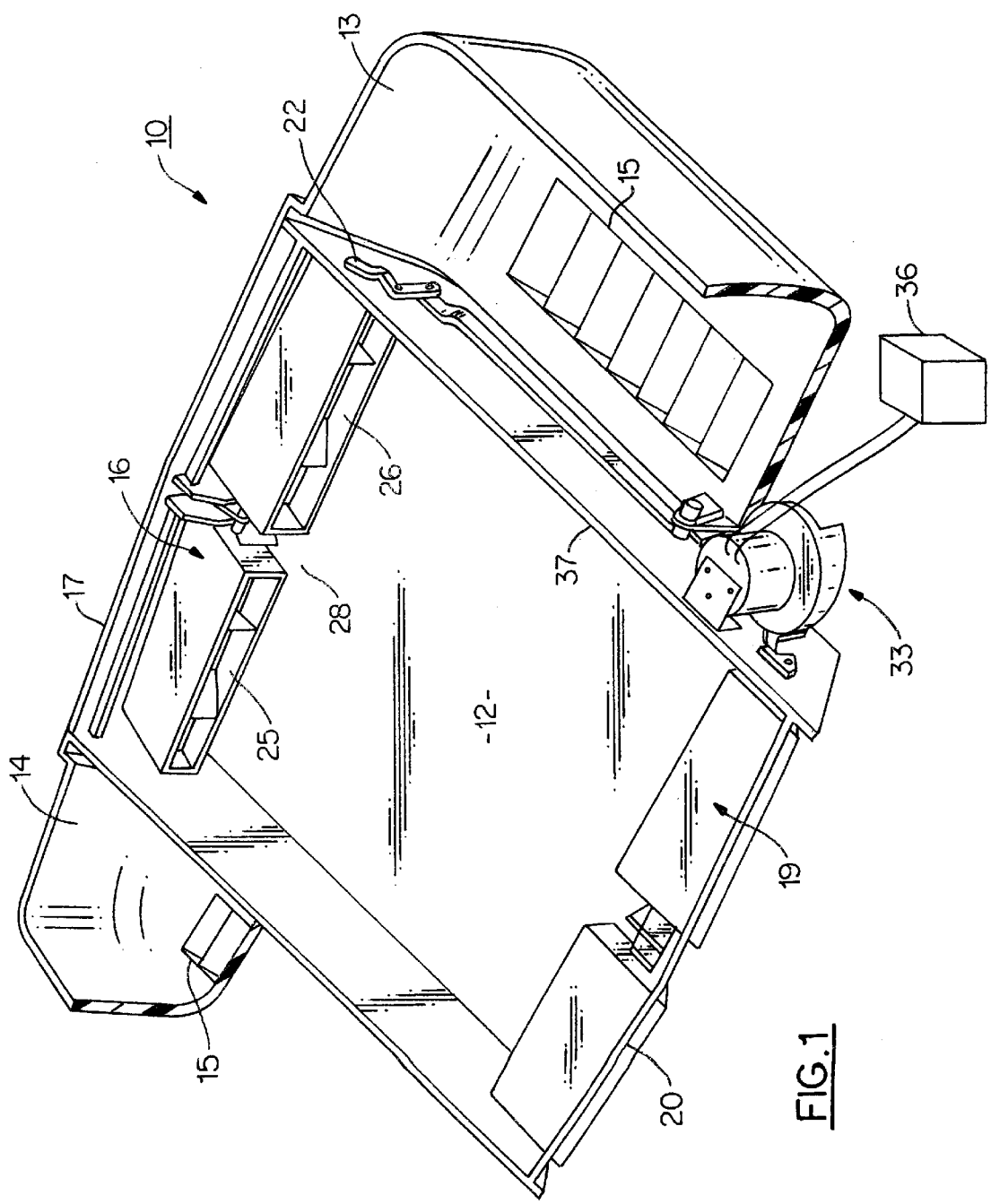
FIG. 1 is a perspective view of a grille containing a comfort air plenum embodying the teachings of the present invention.

Referring now to FIGS. 1–5, there is illustrated a ceiling grille, generally referenced 10, that embodies the teachings of the present invention. The grille is suitable for installation in a motor vehicle such as a recreational vehicle (RV) or the like to return air from the passenger compartment to a roof top air conditioning unit (not shown) and distribute comfort air from the air conditioning unit back into the passenger compartment. The grille 10 includes a central comfort air plenum 12 and two side return air channels 13 and 14. The side return air compartments contain floor installed louvers 15 and are each connected to the air intake of the air conditioning unit by any suitable means.

Air from the passenger compartment is drawn through the air return channels into the air conditioning unit where it is passed through an evaporator coil to condition the return air. The conditioned air is then discharged into the comfort air plenum. The plenum is equipped with a front air distributor 16 located in the front wall 17 of the plenum and a rear air distributor 19 located in the rear wall 20 of the plenum. Each distributor is mounted for rotation in the front and rear walls of the housing by axially aligned end shafts 22 so that the distributors can be turned between a first position to direct air generally in an upward direction and a second position to direct air in a generally downward direction.

Figure 5:
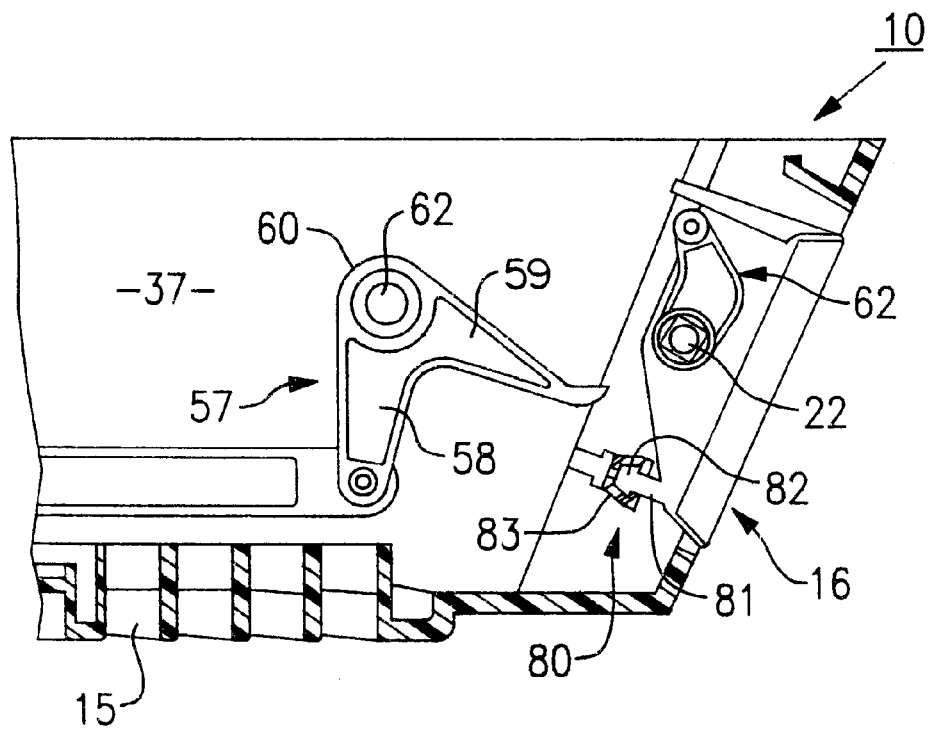
FIG. 5 is a partial view showing one of the deflector vanes in a latched condition.

Each distributor contains a pair of ducts 25 and 26 that are separated by a central channel 28 that contains a horizontally disposed pinion 29 (FIG. 5). A torsion spring 30 is wound in a loaded condition about the pinion and is arranged to rotate the distributor into the upwardly tilted position. As will be explained in greater detail below, the comfort air distributors are automatically positioned to provide for more efficient distribution of comfort air throughout the passenger compartment.

Figure 3:
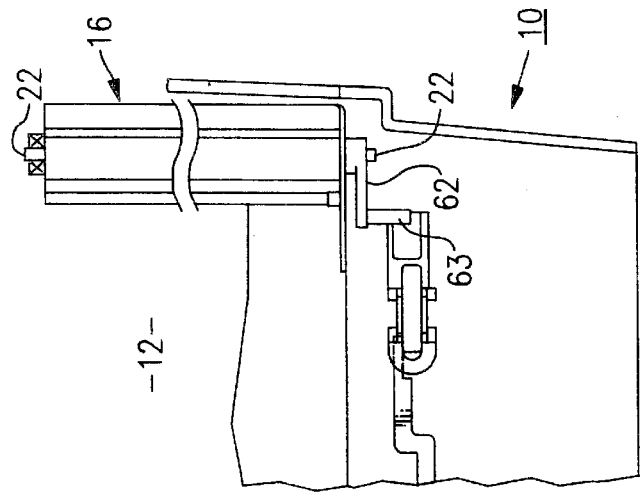
FIG. 3 is a partial top view of the grille shown in FIG. 2.
Figure 3:
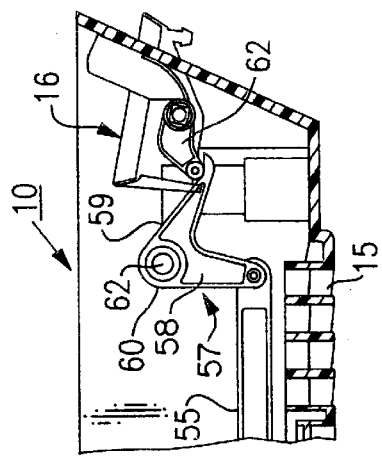
Figure 3:
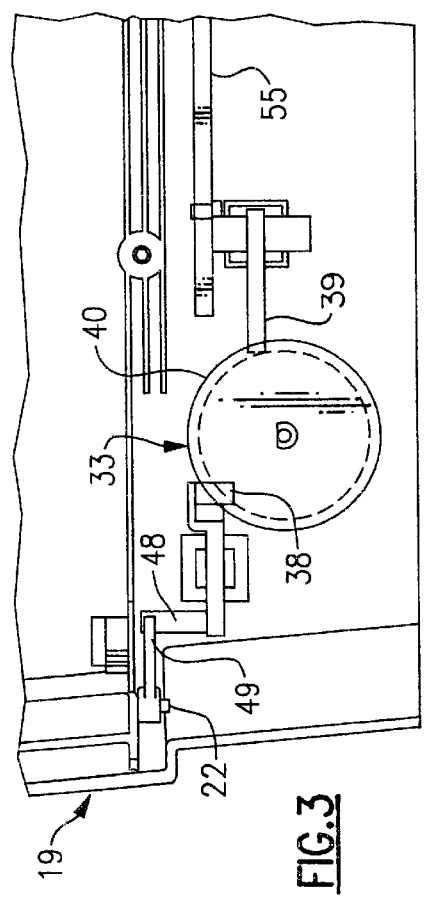

Both comfort air distributors are positioned by means of a cam element generally referenced 33 that is mounted for rotation upon the shaft 34 of a stepper motor 35 mounted in the side wall 37 of the plenum. The motor is remotely operated by a controller 36 that is capable of stepping the motor and the cam in either direction. A pair of cam followers 38 and 39 ride in contact with the profiled cam face 40 of the cam. The first cam follower 38 includes an arm 41 mounted upon a hub 42 which, in turn, is pivotally mounted upon a shaft 43. A second arm 44 is mounted upon the hub 42 and is angularly offset from arm 41 so that the second arm 44 rocks back and forth about the shaft as the cam follower rides over the cam face. A dowel 48 (FIG. 3) extends horizontally from the distal end of the second arm 43 as best shown in FIG. 3.

A rocker arm 49 is attached to one of the end shafts 22 of the rear comfort air deflector 19 and the distal end of the rocker arm rides in contact with the dowel 48. Under the influence of the torsion spring 30, the rocker arm is held in biasing contact against the dowel which, in turn, pressures the cam follower 38 into contact against the cam face of the cam element. As can be seen, under this biasing action, the motion of the cam face is translated efficiently through the coacting members to the rear comfort air deflector 19 to rotate the deflector to a position prescribed by the cam profile.

The second cam follower 39, in the form of an arm, is secured to a pivot pin 50 that is horizontally supported in a stanchion 51. A link 53 is also secured at one end for rotation with the pivot pin so that it turns with the cam follower 39. The opposite end of the link is rotationally secured to the proximal end of an elongated, horizontally disposed connecting bar 55. The distal end of the bar is similarly secured to a crank 57. The crank contains a lever arm 58 and an angularly offset actuator arm 59, both of which are integrally attached to a hub 60. The hub, in turn, is rotatably supported upon a stub shaft 62 so that the crank rotates about the stub shaft.

Figure 2:
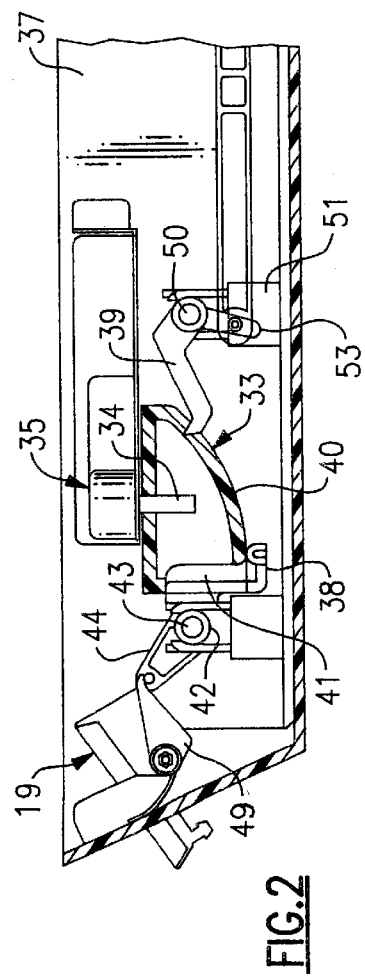
FIG. 2 is a side elevation in section of the grille shown in FIG. 1.
Figure 4:
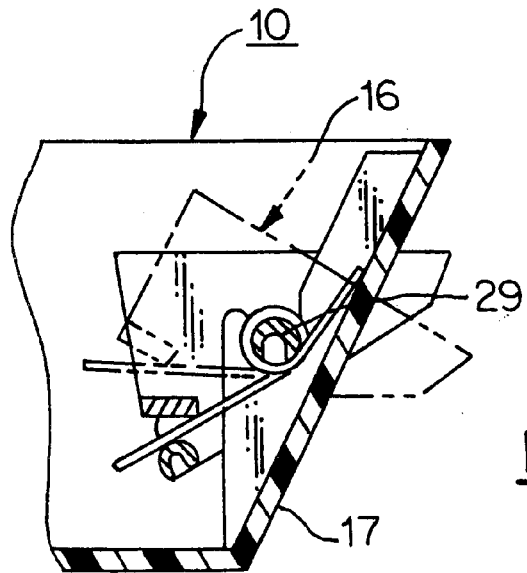
FIG. 4 is a partial sectional view taken along lines 4—4 in FIG. 1 showing a spring used to bias one of the deflectors toward an open position.

As noted above, the front comfort air deflector 18 is rotatably mounted in the front wall of the housing in the same manner as the rear comfort air deflector 19 by end shafts 22. A rocker arm 62 is secured in one of the front comfort air deflector end shafts. The distal end of the rocker arm contains a pin 63 that rides in contact with the actuator arm 59 of the crank. Again, the torsion spring associated with the front comfort air deflector acts upon the deflector to turn the deflector in a counter-clockwise direction, as seen in FIG. 2. This, in turn, biases the rocker arm into contact with the crank so that the rocker arm moves in response to the rotational movement of the crank.

As should now be evident, the rotational positioning of the front comfort air deflector, as that of the rear comfort air deflector, is controlled by the cam 33 acting through the above described linkage. The cam face is profiled to coordinate the positioning of the two deflectors so that the comfort air is most efficiently distributed throughout the passenger compartment throughout the range prescribed by the cam. The range typically extends between a first upwardly tilted position wherein air is directed toward the ceiling and a downwardly directed position wherein air is directed away from the ceiling.

Turning now to FIG. 5, the front comfort air deflector is shown in a fully closed and latched position. Each deflector can be manually turned to this position in the event passengers in the vehicle want to manually close down one or both deflectors. The deflectors are equipped with a latching mechanism, generally referenced 80 for securing the detector in the closed position. The latching mechanism includes a rod 81 attached to the deflector that has an expanded head 82 at its distal end. The head of the rod is arranged to be engaged by a spring clamp 83 when the deflector is turned to the fully closed position to lock the deflector in this position. At this time, the rocker arm associated with the deflector is lifted away from the cam associated linkage thereby removing the deflector from the cam.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A ceiling mounted grille for a motor vehicle for directing conditioned air from an air conditioning unit mounted upon the roof of the vehicle into the passenger compartment of the vehicle, wherein said grille includes a plenum for receiving conditioned air for the air conditioning unit, said plenum having a front wall, a rear wall and opposed side walls, a front deflector vane rotatably mounted in the front wall of said plenum, a rear deflector vane rotatably mounted in the rear wall of the plenum, a first rocker arm connected to the front deflector vane and a second rocker arm connected to said rear deflector vane, said rocker arm being arranged to rotate said deflector vanes between an open position and a closed position, a cam having a profiled camming face thereon, a first cam follower arranged to ride in contact with said camming face and a second cam follower also arranged to ride in contact with said camming face, means for connecting said first rocker arm to said cam follower and said second rocker arm to said second cam follower for selectively positioning the deflection vane in response to the positioning of the cam, and drive means for positioning said cam.

2. The grille of claim 1 that further includes biasing means for holding the cam follower in contact with the cam face.

3. The grille of claim 2 wherein said biasing means is a torsion spring acting upon each deflector vane for rotating the deflector bane in a direction such that each cam followers are urged against the cam face through the first and second rocker arms and said connecting means.

4. The grille of claim 1 wherein said drive means is a stepper motor.

5. The grille of claim 1 wherein said second cam follower is pivotally mounted adjacent to said cam and contains a cam follower arm that rides in contact with said cam face and a pivot arm and said connecting means further includes an elongated link arm connected at one end to said pivot arm and at the opposite end to a crank that is arranged to move the second rocker arm.

6. The grille of claim 3 wherein each deflector vane includes a latch means for holding the deflector vane in a closed position so that the spring biasing force of the torsion spring is released form the associated cam follower.

* * * * *